SMITH & JONES.
Coal Oil Tester.
No. 35,184.  Patented May 6, 1862.
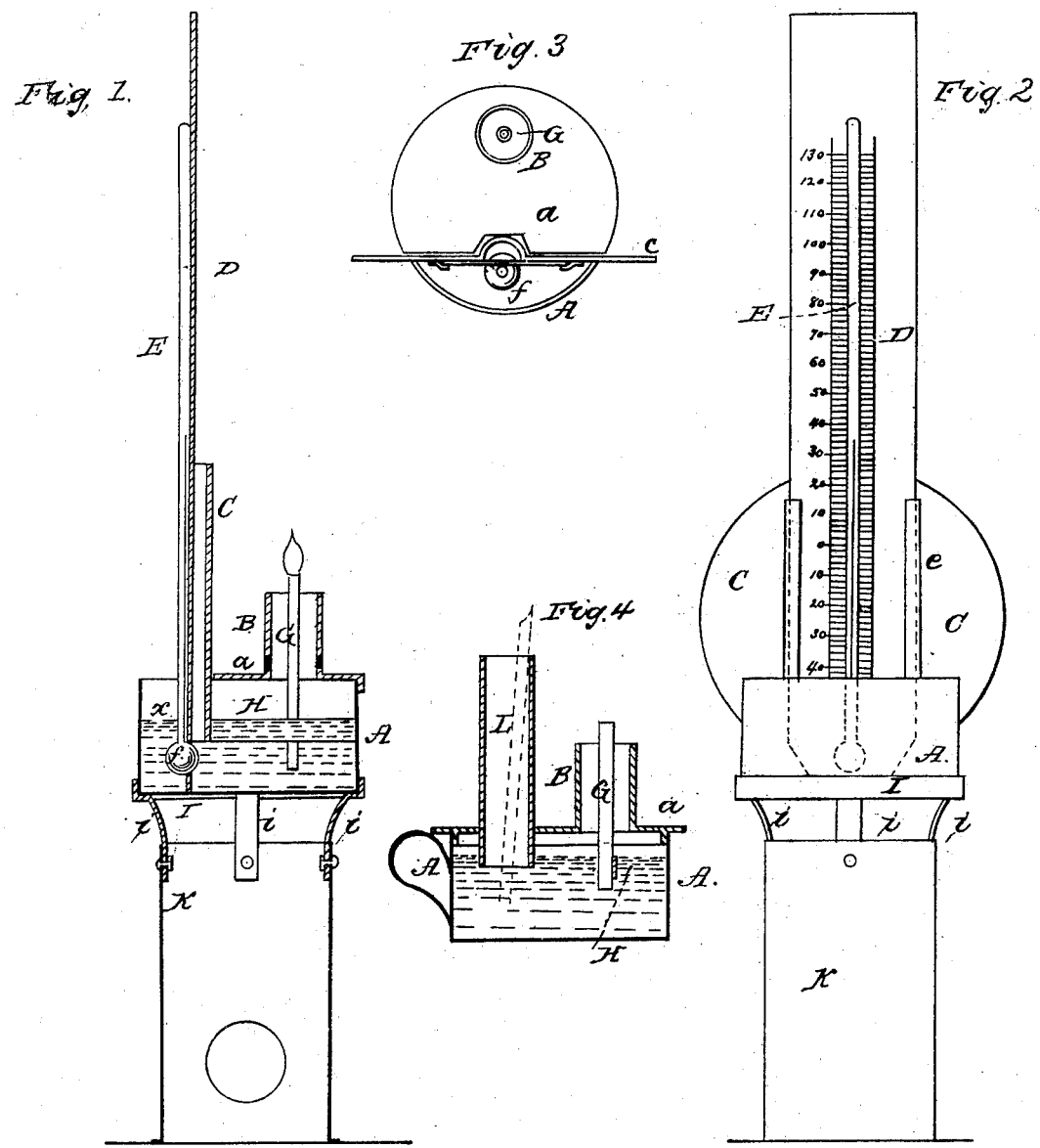

UNITED STATES PATENT OFFICE.

HORACE J. SMITH AND WOODRUFF JONES, OF PHILADELPHIA, PENNSYLVANIA.

IMPROVEMENT IN APPARATUS FOR TESTING COAL-OILS AND OTHER MIXED LIQUIDS.

Specification forming part of Letters Patent No. 35,184, dated May 6, 1852.

*To all whom it may concern:*

Be it known that we, HORACE J. SMITH and WOODRUFF JONES, both of the city of Philadelphia, State of Pennsylvania, have invented an Apparatus for Testing Coal-Oils and other Compound Liquids; and we do hereby declare the following to be a full, clear, and exact description of the same, reference being had to the accompanying drawings, and to the letters of reference marked thereon.

Our invention consists in determining the amount of volatile inflammable matter in compound liquids by means of a thermometer and a flame, the thermometer being applied to the liquids while heat is imparted to the latter, and the vapor generated by the heat being directed to the flame, which will cause the vapor to explode, the number of degrees of heat indicated by the thermometer when the explosion takes place determining the amount of volatile inflammable matter in the liquids.

In order to enable others to practice our invention, we will now proceed to describe the manner of carrying it into effect.

On reference to the accompanying drawings, which form a part of this specification, Figure 1 is a vertical section of the instrument for testing coal-oil and other compound liquids; Fig. 2, a front view; Fig. 3, a plan view, and Fig. 4 a vertical section of a modification of the instrument.

Similar letters refer to similar parts throughout the several views.

On reference to Figs. 1, 2, and 3, A is a small vessel of tin or other suitable material for containing the coal-oil or other fluid to be tested, the vessel being partially covered by a plate, *a*, from which projects a tube, B, and a plate, C, the level of the fluid in the vessel being designated by the line *x*. An ordinary thermometer consisting of the graduated plate D, with a glass tube, E, is secured to flanges *e* on the plate *c* in such a position that the bulb *f* shall be immersed in the fluid without touching the bottom of the vessel.

G is a small wick-tube secured to a cross-bar, H, the lower end of the tube being immersed in the fluid and the upper end terminating at a point a short distance above the tube B, the latter being perforated at the base for the admission of air. The liquid should be poured into the vessel until its surface reaches the upper edge of the cross-bar H.

Coal-oil contains more or less benzine or naphtha, the presence of which not only detracts from the value of the oil as a marketable commodity, but increases its liability to explode. It is desirable, therefore, for the purchaser to be made aware of the percentage of naphtha contained in the oil which he requires, and this may be readily ascertained by the above-described instrument.

In the present instance the vessel is illustrated as resting on a plate, I, attached to strips *i*, secured to a tube, K, the lower end of which rests on the burner of a coal-oil lamp in the same manner as an ordinary glass chimney. Although this method of applying heat to the vessel may be the most cleanly and safe, the vessel may be placed on a stove above a gas-light, or the heat may be imparted in any other manner. When the oil in the vessel becomes heated, the vapors of the benzine or coal-naphtha will rise to the surface, pass upward through the tube B, and, meeting the air which passes the perforations of the latter, will form an explosive mixture, which, coming in contact with the flame, will cause a slight report, and in most cases extinguish the flame. The more benzine or coal-naphtha contained in the coal-oil the less will be the degree of heat required to cause the explosion. By watching the mercury in the tube, therefore, and noting its position in respect to the graduated scale, the moment the explosion takes place the percentage of naphtha contained in the oil can be ascertained.

A table of reference setting forth the number of degrees of heat required to test coal-oils containing different percentages of naphtha will of course be necessary to accompany the above-described instrument, the figures of the table being predetermined by proper chemical tests.

It is essential to the proper working of the apparatus that the mercury-bulb of the thermometer should be isolated from the vapors of naphtha; hence the plate C extends below the surface of the oil in the vessel and across the latter, thereby preventing the vapors from gaining access to the thermometer.

In the modified apparatus illustrated in Fig. 4 a tube, L, is substituted for the plate C, and in place of the ordinary thermometer one so constructed as to fit to the tube is used, care being taken that the bulb of the glass tube is free from contact with the bottom of the vessel and that the tube L projects so far below the surface of the oil that the thermometer is isolated from the vapors of naphtha.

The applicability of the above-described apparatus to the testing of other compound fluids as well as coal-oil with the view of determining the quantity of volatile inflammable matter in such fluids will be apparent.

We claim as our invention and desire to secure by Letters Patent—

Determining the amount of volatile inflammable matter in compound liquids by means of a thermometer and a flame, the thermometer being applied to the liquid while the heat is imparted to the latter, and the vapor generated by the heat being directed to the flame, substantially as set forth.

In testimony whereof we have signed our names to this specification in the presence of two subscribing witnesses.

HORACE J. SMITH.
WOODRUFF JONES.

Witnesses:
HENRY HOWSON,
JOHN WHITE.